(12) United States Patent
Modrzejewski

(10) Patent No.: US 9,643,719 B2
(45) Date of Patent: May 9, 2017

(54) ELECTRO-RHEOLOGICAL ELASTOMERIC, VARIABLE-STIFFNESS FLIGHT CONTROL DEVICE

(71) Applicant: Bell Helicopter Textron Inc., Fort Worth, TX (US)

(72) Inventor: Brian Stanley Modrzejewski, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 324 days.

(21) Appl. No.: 14/749,208

(22) Filed: Jun. 24, 2015

(65) Prior Publication Data

US 2016/0375996 A1 Dec. 29, 2016

(51) Int. Cl.
| | |
|---|---|
| *B64C 13/50* | (2006.01) |
| *B64C 27/57* | (2006.01) |
| *B64C 27/04* | (2006.01) |
| *G05G 9/047* | (2006.01) |
| *G05G 5/02* | (2006.01) |

(52) U.S. Cl.
CPC .............. *B64C 27/57* (2013.01); *B64C 27/04* (2013.01); *G05G 5/02* (2013.01); *G05G 9/047* (2013.01); *G05G 2009/04729* (2013.01)

(58) Field of Classification Search
CPC . G05G 9/02; G05G 9/047; G05G 2009/04729
USPC .................................................. 244/220, 221
See application file for complete search history.

(56) References Cited

U.S. PATENT DOCUMENTS

| | | | | |
|---|---|---|---|---|
| 4,134,560 A | * | 1/1979 | Messerschmidt | B64C 27/58 244/17.25 |
| 4,865,277 A | * | 9/1989 | Smith | B64C 13/12 244/229 |
| 5,619,195 A | * | 4/1997 | Allen | G05G 9/047 200/6 R |
| 6,373,465 B2 | * | 4/2002 | Jolly | A63F 13/06 345/156 |
| 6,681,905 B2 | * | 1/2004 | Edmondson | B60G 13/001 188/130 |
| 8,356,977 B2 | * | 1/2013 | Jones | B64C 27/51 188/290 |
| 2008/0115061 A1 | * | 5/2008 | Larson | B64C 13/04 715/702 |
| 2009/0159382 A1 | * | 6/2009 | Chemouni | F16F 9/145 188/290 |

(Continued)

*Primary Examiner* — Richard G Davis
(74) *Attorney, Agent, or Firm* — Alison A. Woodruff

(57) ABSTRACT

According to one embodiment, a flight control device includes a grip, a stick associated with the grip, and a gimbal. The stick defines a first axis. The gimbal includes a first platform, a second platform, a first electro-rheological elastomeric bearing, and a second electro-rheological elastomeric bearing. The first platform is coupled to the stick and configured to rotate on a second axis that is perpendicular to the first axis. The second platform is in mechanical communication with the first platform and configured to rotate on a third axis that is perpendicular to the second axis. The first electro-rheological elastomeric bearing defines the second axis, and the second electro-rheological elastomeric bearing defines the third axis. The first and second electro-rheological elastomeric bearing being configured to each have a variable stiffness.

18 Claims, 7 Drawing Sheets

(56) References Cited

U.S. PATENT DOCUMENTS

| | | | |
|---|---|---|---|
| 2009/0294222 A1* | 12/2009 | Piech | B66B 7/048 187/410 |
| 2013/0074631 A1* | 3/2013 | Hanlon | B64C 13/04 74/471 XY |
| 2015/0245927 A1* | 9/2015 | Thorsteinsson | A61F 5/0102 623/52 |
| 2016/0004270 A1* | 1/2016 | Taylor | B64C 13/04 74/491 |

* cited by examiner

ELECTRO-RHEOLOGICAL ELASTOMERIC, VARIABLE-STIFFNESS FLIGHT CONTROL DEVICE

TECHNICAL FIELD

This invention relates generally to a rotorcraft, and more particularly, to an electro-rheological elastomeric, variable-stiffness flight control device for a rotorcraft.

BACKGROUND

A rotorcraft may include one or more rotor systems. One example of a rotorcraft rotor system is a main rotor system. A main rotor system may generate aerodynamic lift to support the weight of the rotorcraft in flight, and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to adjust the stiffness of a flight control device to a preferred setting. A technical advantage of one embodiment may include the capability to eliminate "stiff" spots experienced by mechanical variable-stiffness flight control devices. A technical advantage of one embodiment may include the capability to reduce maintenance costs. A technical advantage of one embodiment may include the capability to reduce the weight of a flight control device.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
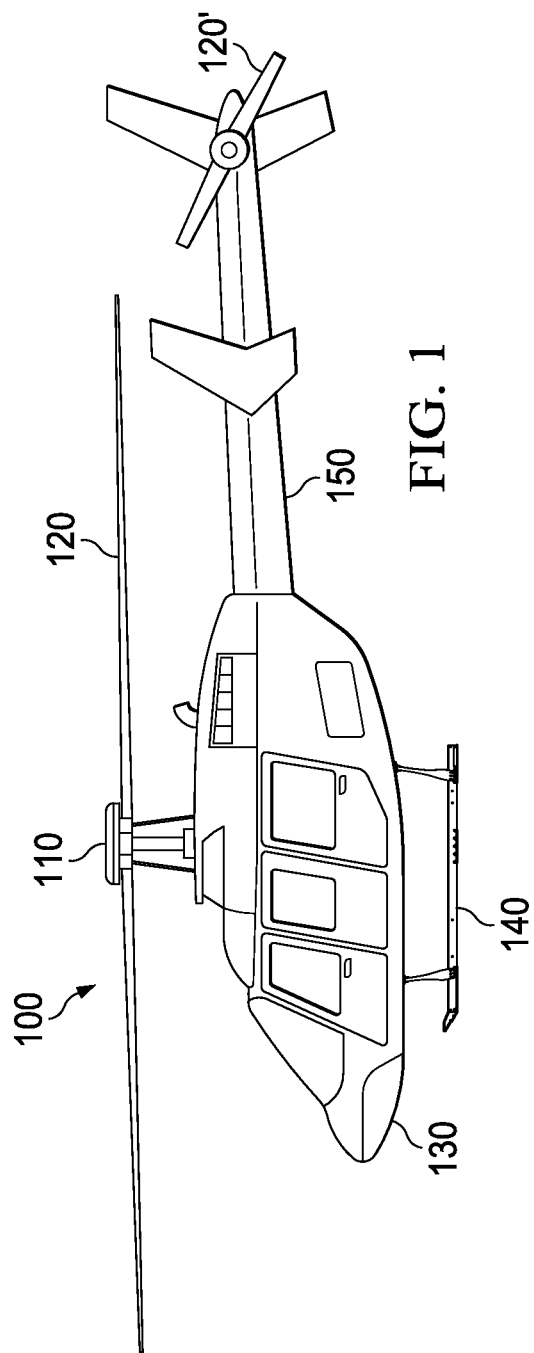
FIG. 1 shows a rotorcraft, according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

A pilot may manipulate one or more pilot flight control devices in order to achieve controlled aerodynamic flight. Inputs provided by the pilot to the pilot flight control devices may be transmitted mechanically and/or electronically (e.g., via a fly-by-wire flight control system) to flight control systems. Flight control systems may represent devices operable to change the flight characteristics of the aircraft. Examples of flight control systems on rotorcraft 100 may include the control system operable to change the positions of blades 120 and blades 120'.

Rotorcraft 100 may feature at least three sets of pilot flight control devices: a collective control assembly, a cyclic control assembly, and a pedal assembly. Although examples discussed herein describe pilot flight controls such as cyclic control assemblies, collective control assemblies, and pedal assemblies, teachings of certain embodiments recognize that other pilot flight controls may be used. For example, in some embodiments, a tiltrotor aircraft may include a power control device and a thrust control device.

In general, cyclic pilot flight controls may allow a pilot to impart cyclic motions on blades 120. Cyclic motions in blades 120 may cause rotorcraft 100 to tilt in a direction specified by the pilot. For tilting forward and back (pitch) and/or tilting sideways (roll), the angle of attack of blades 120 may be altered cyclically during rotation, creating different amounts of lift at different points in the cycle.

Collective pilot flight controls may allow a pilot to impart collective motions on blades 120. Collective motions in blades 120 may change the overall lift produced by blades 120. For increasing or decreasing overall lift in blades 120, the angle of attack for all blades 120 may be collectively altered by equal amounts at the same time resulting in ascents, descents, acceleration, and deceleration.

Anti-torque pilot flight controls may allow a pilot to change the amount of anti-torque force applied to rotorcraft 100. As explained above, blades 120' may provide thrust in the same direction as the rotation of blades 120 to counter the torque effect created by rotor system 110 and blades 120. Anti-torque pilot flight controls may change the amount of anti-torque force applied to change the heading of rotorcraft 100. For example, providing anti-torque force greater than the torque effect created by rotor system 110 and blades 120 may cause rotorcraft 100 to rotate in a first direction, whereas providing anti-torque force less than the torque effect created by rotor system 110 and blades 120 may cause rotorcraft 100 to rotate in an opposite direction. In some embodiments, anti-torque pilot flight controls may change the amount of anti-torque force applied by changing the pitch of blades 120', increasing or reducing the thrust produced by blades 120' and causing the nose of rotorcraft 100 to yaw in the direction of the applied pedal. In some embodiments, rotorcraft 100 may include additional or different anti-torque devices (such as a rudder or a NOTAR anti-torque device), and the anti-torque pilot flight controls may change the amount of force provided by these additional or different anti-torque devices.

Figure 2:
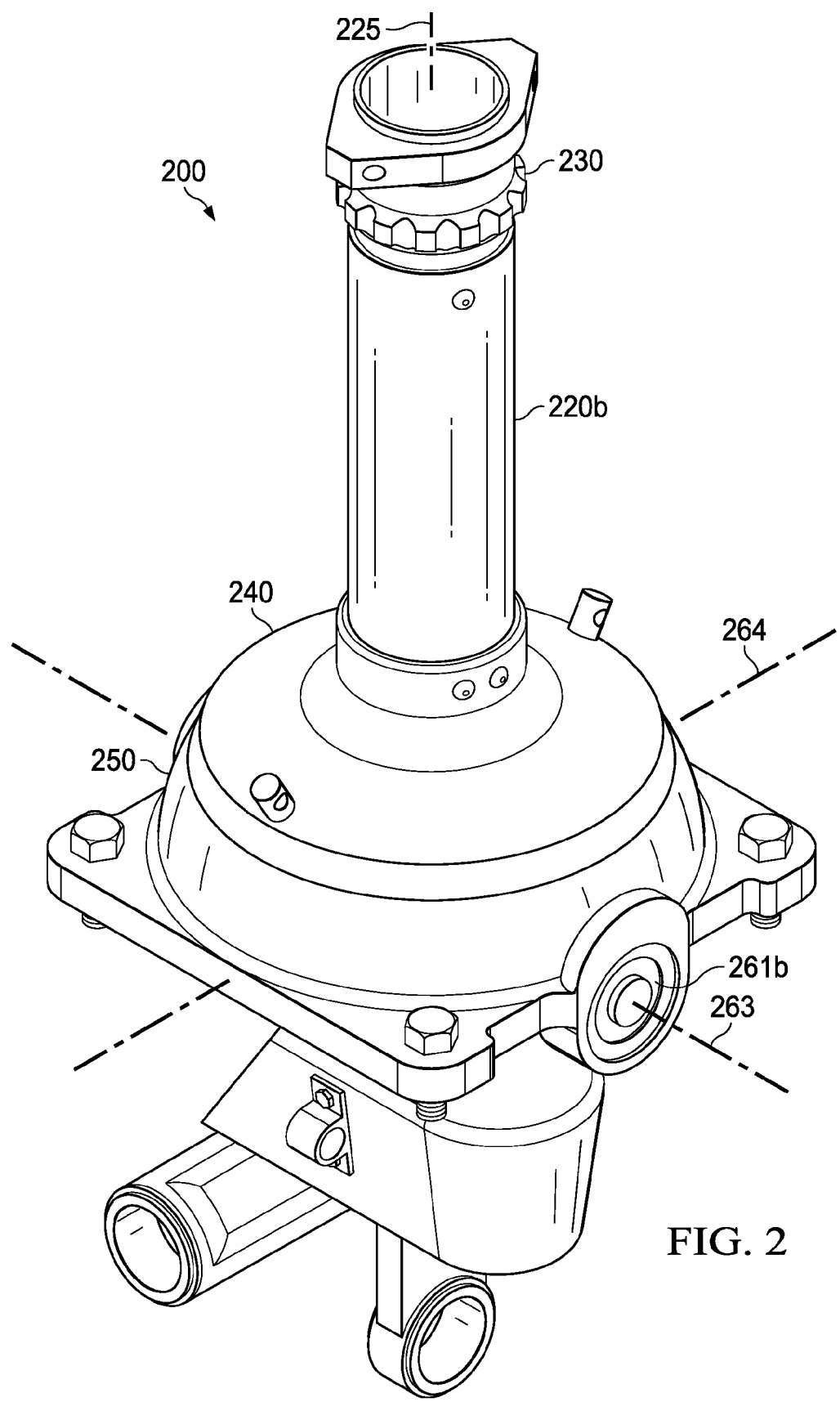
FIG. 2 shows a perspective view of a flight control device, according to one example embodiment.
Figures 3, 5:
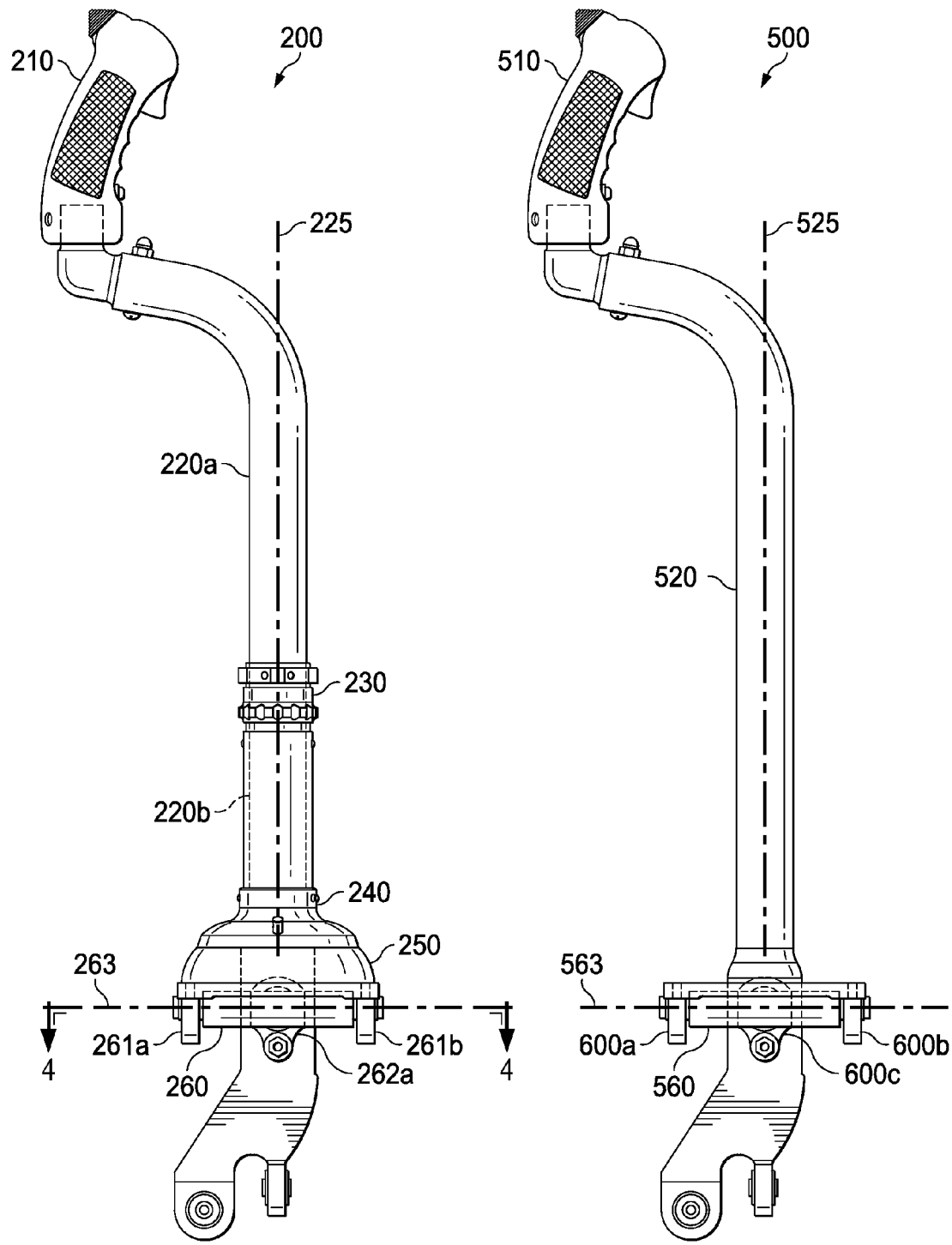
FIG. 3 shows a side view of a flight control device, according to one example embodiment.
FIG. 5 shows a side view of an electro-rheological elastomeric, variable-stiffness flight control device, according to one example embodiment.
Figure 4:
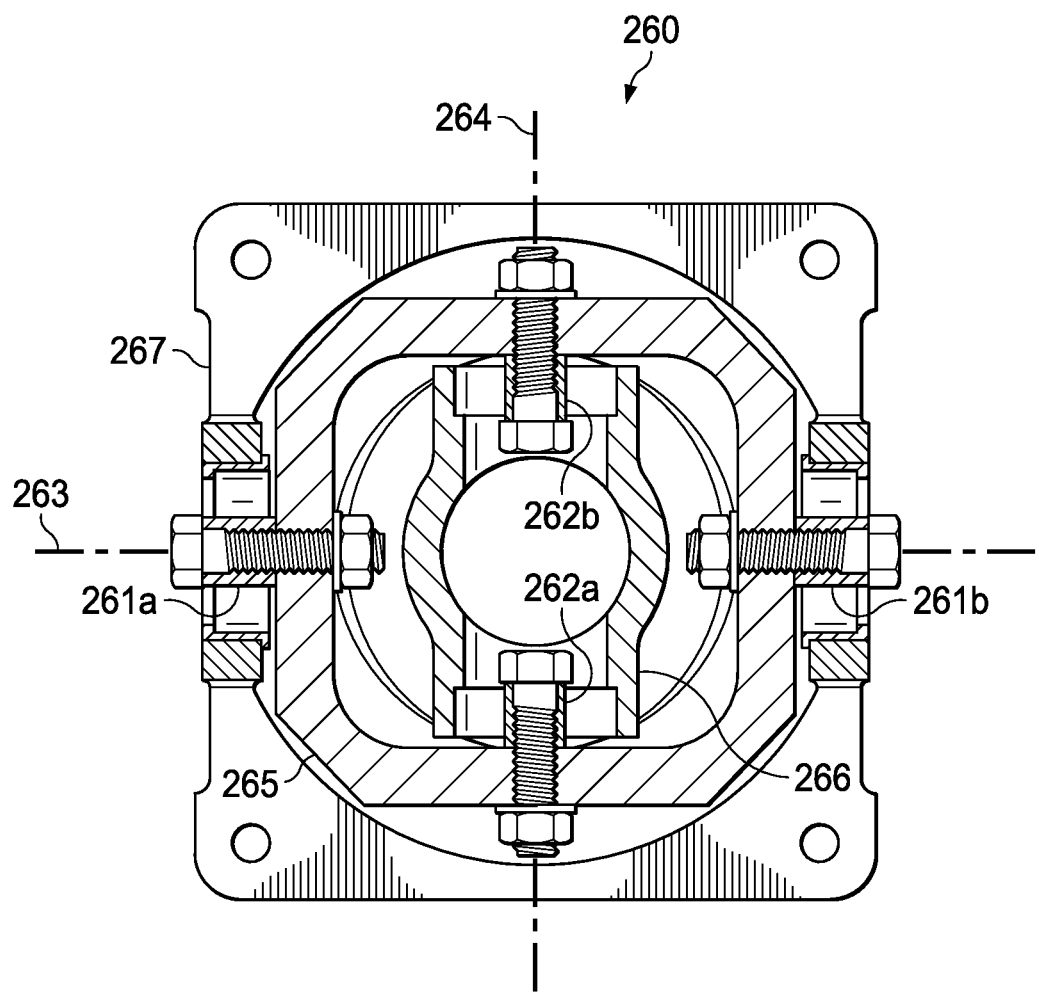
FIG. 4 shows a cross section view of the flight control device of FIG. 4.

FIGS. 2, 3, and 4 show an example of a flight control device, flight control device 200. Flight control device 200 may represent a cyclic control assembly. Flight control device 200 may include a grip 210, sticks 220a and 220b, friction knob 230, support 240, dome 250, and gimbal 260. Stick 220a and stick 220b may define axis 225. Gimbal 260 may include three platforms, outer platform 264, inner platform 266, and stationary platform 267, and two pairs of bearings, ball bearing 261a and 261b, and ball bearing 262a and 262b. Ball bearings 261a and 261b may define axis 263 and ball bearings 262a and 262b may define axis 264.

Ball bearings 261a and 261b may be configured to allow outer platform 265 to be rotatable on axis 263; ball bearings 262a and 262b may be configured to allow inner platform 266 to be rotatable on axis 264. Because inner platform 266 is in mechanical communication with outer platform 265, inner platform 266 is rotatable on both axis 263 and 264. Stationary platform 267 may be stationary relative to rotorcraft 100. Stick 220b may be coupled to an interior portion of inner platform 266.

Inner platform 266 of gimbal 260, support 240, stick 220b, friction knob 230, stick 220a, and grip 210 can be mechanically coupled such that any movement experienced by grip 210 is transferred to stick 220a, friction knob 230, stick 220b, support 240, and inner platform 266 of gimbal 260. In addition, because inner platform 266 is rotatable on both axis 263 and 264, grip 210 is rotatable around axis 263 and 264.

Dome 250 may represent a smooth surface configured to allow support 240 to ride along the surface of dome 250 when the friction setting is set to a low value, which will be explained in more detail below. Dome 250 may be stationary in relation to rotorcraft 100.

Friction knob 230 can be configured such that twisting friction knob 230 clockwise around axis 225 moves stick 220b and support 240 downward, along axis 225, and increases the friction between support 240 and dome 250. Turning friction knob 230 counter-clockwise around axis 225 may move stick 220b and support 240 upward, along axis 225, and decrease the friction between support 240 and dome 250. Therefore, when the friction between support 240 and dome 250 is increased, grip 210 may become harder to move; when the friction between support 240 and dome 250 is decreased, grip 210 may become easier to move.

There may be several reasons why an adjustment of the friction between support 240 and dome 250 is preferable. For example, a pilot of rotorcraft 100 may desire to have the stiffness of flight control device 200 increased while rotorcraft 100 is hovering. The stiffness of flight control device 200 may also be preferable to be increased when certain components of rotorcraft 100 are being replaced or repaired.

Even though using friction knob 230 has its advantages, such as adjusting the stiffness of a flight control device, it may also have some potential disadvantages. For example, one potential disadvantage may be the level of difficulty a pilot has adjusting the stiffness to a specific preferred level. Another potential disadvantage may be the level of difficulty a pilot has reaching down to friction knob 230 while the aircraft is in flight. Another potential disadvantage may be local "stiff" spots due to the mechanical system. Another potential disadvantage is that dome 250 and/or support 240 may experience wear that requires replacement of dome 250 and/or support 240. Yet another potential disadvantage is the additional weight of friction knob 230 and other components that may be required. Because there can be several potential disadvantages to using friction knob 230 to adjust the stiffness of flight control device 200, there is a need for an improved flight control device which allows the stiffness to be easily altered.

FIG. 5 shows an example embodiment of a flight control device, flight control device 500. Flight control device 500 may represent a cyclic control assembly. Flight control device 500 can feature grip 510, stick 520, and gimbal 560. Gimbal 560 can include a pair of electro-rheological (ER) elastomeric bearing assemblies, ER elastomeric bearings 600a, 600b, 600c, and 600d (not shown). ER elastomeric bearing 600a and 600b may define axis 563 and ER elastomeric bearings 600c and 600d may define axis 564 (not shown). Stick 520 may define a longitudinal axis, axis 525.

Grip 510, stick 520, and gimbal 560 can be similar to grip 210, stick 220a, and gimbal 260, respectively, of flight control device 200. ER elastomeric bearings 600a, 600b, 600c, and 600d can be positioned similarly on gimbal 560 as ball bearings 261a, 261b, 262a, and 262b are positioned on gimbal 260. However, instead of the bearings being ball bearings, they are ER elastomeric bearings.

Figure 6:
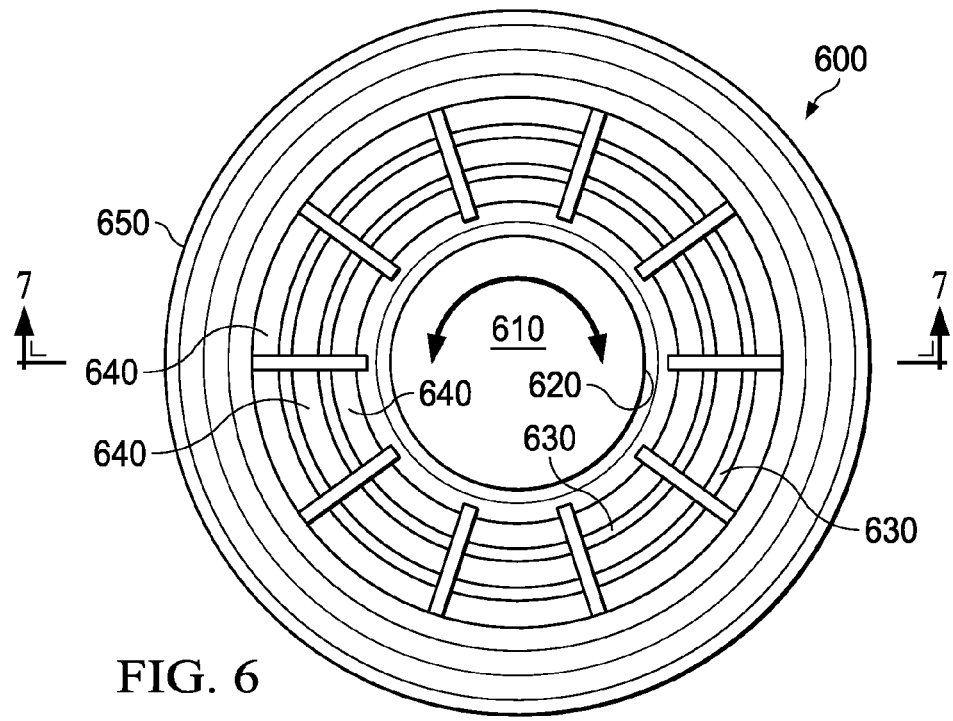
FIG. 6 shows a top view of an electro-rheological elastomeric bearing, according to one example embodiment.
Figure 7:
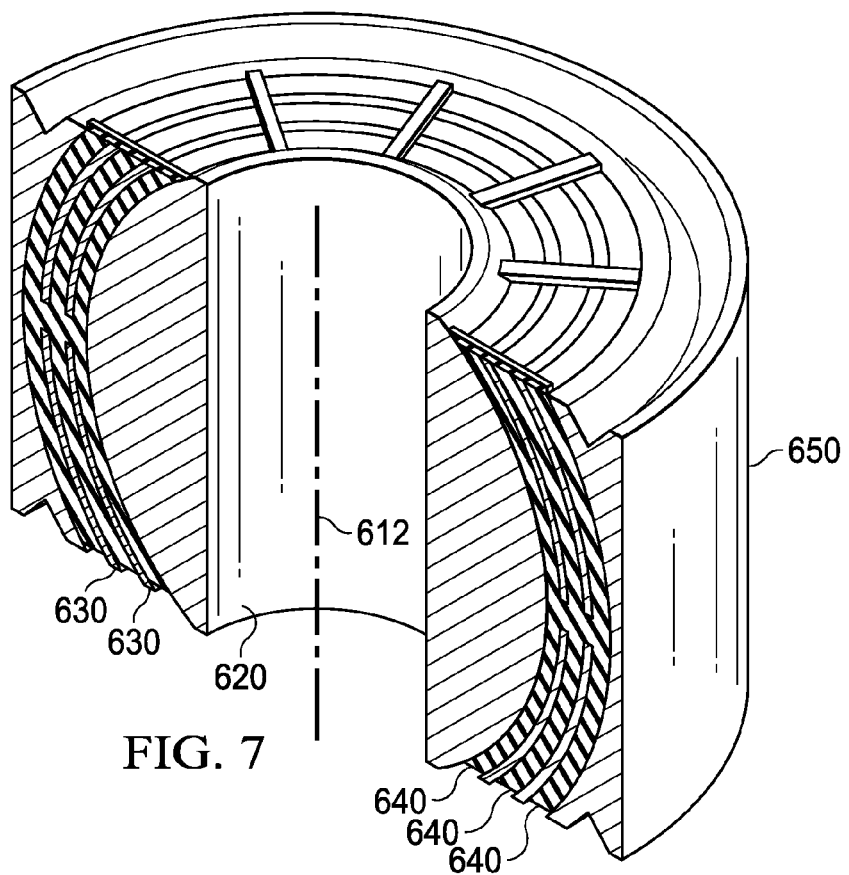
FIG. 7 shows a perspective, section view of the electro-rheological elastomeric bearing of FIG. 7, according to one example embodiment.

FIGS. 6 and 7 show an example embodiment of an ER elastomeric bearing, ER elastomeric bearing 600, which can be used in a flight control device, such as flight control device 500. ER elastomeric bearing 600 can have multiple layers that are laminated or vulcanized together. When a rotational load 660 is applied to ER elastomeric bearing 600, ER elastomeric bearing 600 may flex in the direction of the load. The rotation of ER elastomeric bearing 600 may be limited depending on the stiffness of the ER elastomeric layers 640.

ER elastomeric bearing 600 can allow the stiffness of a flight control device, such as flight control device 500, to be adjusted. ER elastomeric bearing 600 can replace ball bearing 261a, 261b, 262a, and 262b of flight control device 200.

ER elastomeric bearing 600 includes a shaft 610, a ground shaft 620, one or more chargeable shims 630, and one or more ER elastomer layers 640, according to one example. Shaft 610 may define an axis, axis 612. All or some of the subcomponents of ER elastomeric bearing 600 may be conjoined. For example, shaft 610 may be conjoined with ground shaft 620. Ground shaft 620 may be conjoined with an ER elastomer layer 640. Each ER elastomer layer 640 may be conjoined with ground housing 650 and/or at least one chargeable shim 630. Shaft 610, ground shaft 620, chargeable shim 630, and ground housing 650 may be manufactured from a metal, such as stainless steel.

In one example embodiment, ER elastomer layer 640 is manufactured from an ER elastomer. ER elastomer is a composition comprising natural rubber and polarizable particles that undergoes changes in its stiffness when subjected to an electrical field, or voltage. The level of voltage to ER elastomeric bearing 600 can be determined by a stiffness request unit, such as stiffness request unit 900, which will be discussed further, below. ER elastomer layer 640 can have a convex cylinder shape. In another example, ER elastomer layer can have a straight cylinder shape.

One example of an ER elastomer that can be used for ER elastomer layer 640 is a composition comprising polyurethane as the matrix of the ER elastomer and a multi-coated particle as the polarizable particles. The multi-coated particles can include a core-shell structure that consists of hydroxyl-iron core with a high conductivity and a silica shell with a high dielectric constant. This composition can result in a starting shear modulus of five-hundred pounds per square inch (PSI) and a max field modulus of two-thousand PSI, depending on the voltage applied to the composition.

Figure 8:
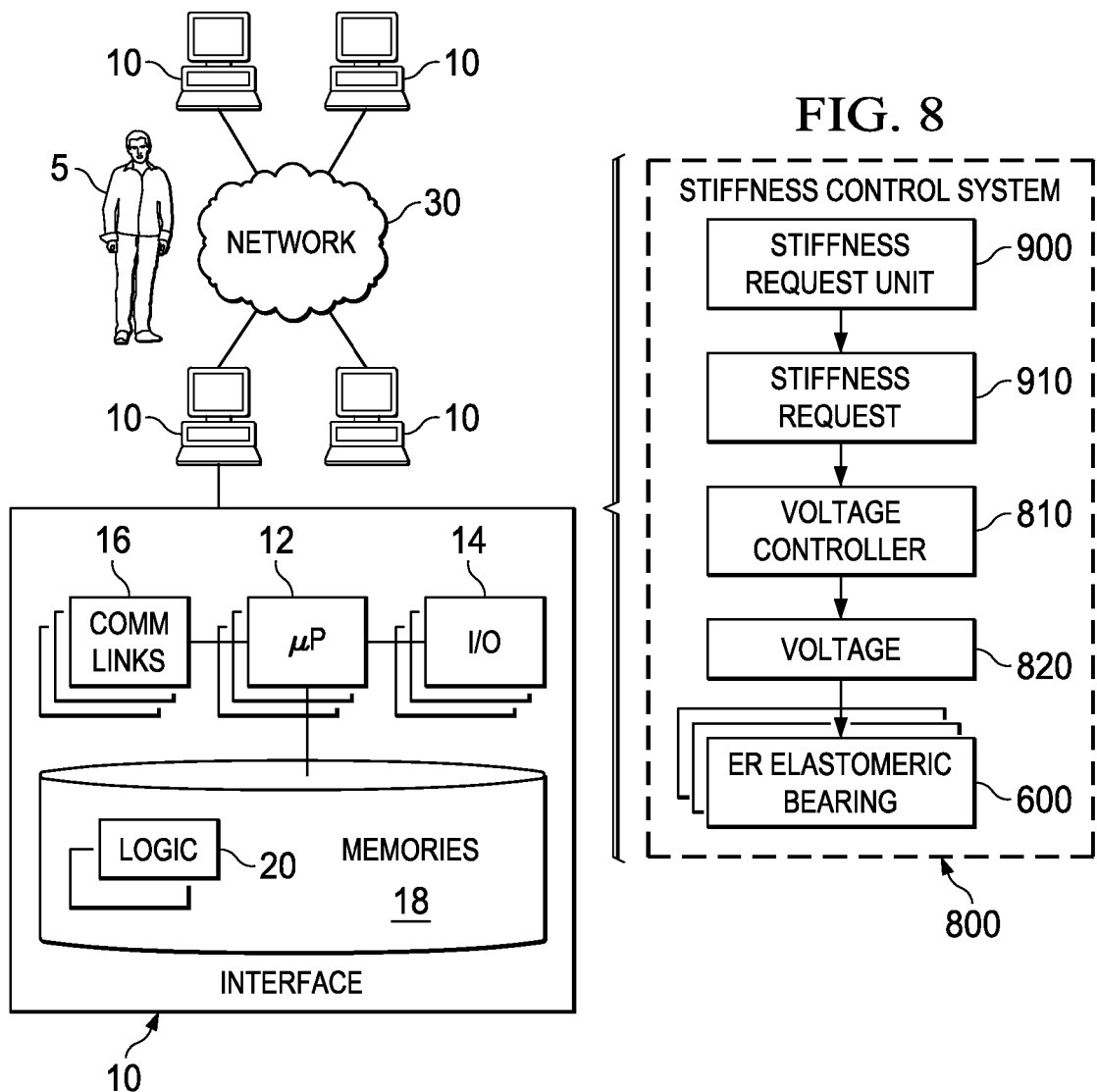
FIG. 8 shows a stiffness control system, according to one example embodiment.

The voltage to chargeable shim 630 of ER elastomeric bearing 600 may be managed by a stiffness control system. FIG. 8 shows an example of a stiffness control system, stiffness control system 800. Stiffness control system 800 may include a stiffness request unit 900, a voltage controller 810, and one or more ER elastomeric bearings 600.

Figure 9:
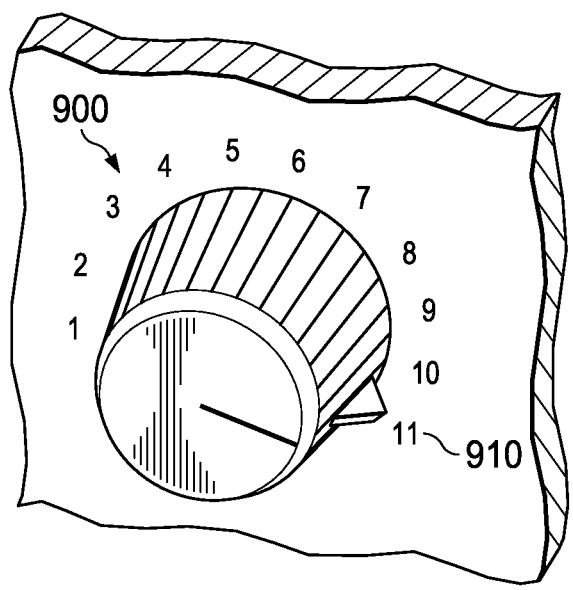
FIG. 9 shows a stiffness request unit, according to one example embodiment.

FIG. 9 shows a stiffness request unit 900, according to one example embodiment. Stiffness request unit 900 can represent any device that may be configured to input a user's stiffness request 910 and send the stiffness request 910 to a voltage controller 810. For example, stiffness request unit 900 may be a dial with several levels of increasing stiffness. In another example, stiffness request unit 900 may be a digital display that allows a user to select from a set number of levels of stiffness requests 910. In yet another example, stiffness request unit 900 may be a slide switch with an infinite number of stiffness requests 910.

In one example embodiment, voltage controller 810 represents any device that can be configured to receive a stiffness request 910 from the stiffness request unit 900 and send a certain voltage 820 that correlates to the stiffness request 910 to ER elastomeric bearing 600. The correlation of a stiffness request 910 to a voltage 820 may be determined by a formula. In another example, the correlation of a stiffness request 910 to a voltage 820 may be determined by a look-up table of values.

Elements of stiffness control system 800 may be implemented at least partially by one or more computer systems 10. All, some, or none of the components of stiffness control system 800 may be located on or near an aircraft such as rotorcraft 100.

Users 5 may access stiffness control system 800 through computer systems 10. For example, in some embodiments, users 5 may provide voltages 820 that correlate to specific stiffness requests 910. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30. Computer system 10 may exist wholly or partially on-board the aircraft, off-board the aircraft (e.g., in a ground station), or a combination of the two.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Other uses for ER elastomeric bearing 600 are contemplated. For example, other flight control devices where a variable stiffness is desired, such as collective control assemblies and anti-torque pedal assemblies, may benefit from ER elastomeric bearing.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A flight control device, comprising:
   a grip;
   a stick associated with the grip, the stick defining a first axis; and
   a gimbal comprising:
      a first platform coupled to the stick, the first platform configured to rotate on a second axis that is perpendicular to the first axis;
      a second platform in mechanical communication with the first platform, the second platform configured to rotate on a third axis that is perpendicular to the second axis;
      a first electro-rheological elastomeric bearing defining the second axis, the first electro-rheological elastomeric bearing being configured to have a variable stiffness; and
      a second electro-rheological elastomeric bearing defining the third axis, the second electro-rheological elastomeric bearing being configured to having variable stiffness;
   wherein the first electro-rheological elastomeric bearing comprises a plurality of electro-rheological elastomeric layers.

2. The flight control device of claim 1, wherein a cross-section of each of the electro-rheological elastomeric layers is circular.

3. The flight control device of claim 1, wherein the electro-rheological elastomeric bearing comprises a ground shaft that is adhered to an interior portion of at least one of the electro-rheological elastomeric layers.

4. The flight control device of claim 1, wherein each of the plurality of electro-rheological elastomeric layers has a composition comprising polyurethane, hydroxyl-iron, and silica.

5. The flight control device of claim 4, wherein the composition has a shear modulus range from five-hundred pounds per square inch to two-thousand pounds per square inch.

6. The flight control device of claim 1, wherein the first electro-rheological elastomeric bearing comprises a chargeable shim between two of the electro-rheological elastomeric layers.

7. The flight control device of claim 6, wherein the stiffness of the electro-rheological elastomeric layers is determined by a stiffness request unit, the stiffness request unit being operable to transmit a stiffness request to a voltage controller, the voltage controller being operable to receive the stiffness request, determine a corresponding voltage, and transmit the corresponding voltage to the chargeable shim.

8. The flight control device of claim 7, wherein the voltage controller determines the corresponding voltage by using a look-up table.

9. The flight control device of claim 7, wherein the stiffness request unit is a dial.

10. A rotorcraft, comprising:
    a body;
    a rotor system coupled to the body, the rotor system comprising a blade; and
    a flight control device, comprising:
       a grip;
       a stick associated with the grip, the stick defining a first axis; and
       a gimbal comprising:
          a first platform coupled to the stick, the first platform configured to rotate on a second axis that is perpendicular to the first axis;
          a second platform in mechanical communication with the first platform, the second platform configured to rotate on a third axis that is perpendicular to the second axis;
          a first electro-rheological elastomeric bearing defining the second axis, the first electro-rheological elastomeric bearing being configured to have a variable stiffness; and
          a second electro-rheological elastomeric bearing defining the third axis, the second electro-rheological elastomeric bearing being configured to have a variable stiffness;
    wherein the first electro-rheological elastomeric bearing comprises a plurality of electro-rheological elastomeric layers.

11. The rotorcraft of claim 10, wherein a cross-section of each of the electro-rheological elastomeric layers is circular.

12. The rotorcraft of claim 10, wherein the electro-rheological elastomeric bearing comprises a ground shaft that is adhered to an interior portion of at least one of the electro-rheological elastomeric layers.

13. The rotorcraft of claim 10, wherein each of the plurality of electro-rheological elastomeric layers has a composition comprising polyurethane, hydroxyl-iron, and silica.

14. The rotorcraft of claim 13, wherein the composition has a shear modulus range from five-hundred pounds per square inch to two-thousand pounds per square inch.

15. The rotorcraft of claim 10, wherein the first electro-rheological elastomeric bearing comprises a chargeable shim between two of the electro-rheological elastomeric layers.

16. The rotorcraft of claim 15, wherein the stiffness of the electro-rheological elastomeric layers is determined by a stiffness request unit, the stiffness request unit being operable to transmit a stiffness request to a voltage controller, the voltage controller being operable to receive the stiffness request, determine a corresponding voltage, and transmit the corresponding voltage to the chargeable shim.

17. The rotorcraft of claim 16, wherein the voltage controller determines the corresponding voltage by using a look-up table.

18. The rotorcraft of claim 16, wherein the stiffness request unit is a dial.

* * * * *